United States Patent [19]
Green

[11] Patent Number: 5,137,962
[45] Date of Patent: Aug. 11, 1992

[54] CARBON BLACK EXHIBITING SUPERIOR TREADWEAR/HYSTERESIS PERFORMANCE

[75] Inventor: Martin C. Green, Burlington, Mass.

[73] Assignee: Cabot Corporation, Boston, Mass.

[21] Appl. No.: 475,882

[22] Filed: Feb. 6, 1990

[51] Int. Cl.$^5$ .................. C08K 3/04; C09C 1/48; C09C 1/50

[52] U.S. Cl. .................. 524/496; 423/445; 423/450

[58] Field of Search ............ 423/445, 450, 456, 458, 423/449; 524/495, 496, 847

[56] References Cited

U.S. PATENT DOCUMENTS

| | | |
|---|---|---|
| 4,250,145 | 2/1981 | Pobst, Jr. et al. .................. 422/151 |
| 4,478,973 | 10/1984 | Misono et al. .................. 524/496 |
| 4,503,027 | 3/1985 | Cheng .................. 422/150 |
| 4,548,980 | 10/1985 | Nagata et al. .................. 524/496 |
| 4,582,695 | 4/1986 | Dilbert et al. .................. 423/150 |
| 4,784,695 | 11/1988 | Mito et al. .................. 524/496 |

OTHER PUBLICATIONS

ASTM Designation D 1765-90, "Standard Classification System for Carbon Blacks Used in Rubber Products", pp. 315-318, Jun. 1990.

Cabot, "Carbon Blacks for Specialty Applications", Jan. 1990.

Cabot, "Carbon Blacks for Rubber Applications", Mar. 1989.

*Primary Examiner*—Michael Lewis
*Assistant Examiner*—Stephen G. Kalinchak
*Attorney, Agent, or Firm*—L. A. Chaletsky

[57] ABSTRACT

Superior treadwear/hysteresis carbon blacks having a CTAB of about 90-98 m$^2$/g, a N$_2$SA of about 92-102 m$^2$/g, an I$_2$ No. of 90-98 m$^2$/g, a DBP of about 126-136 cc/100 g, a CDBP of about 102-110 cc/100 g, and a Tint of about 104-112. Also disclosed are rubber compositions containing the carbon blacks which exhibit superior treadwear/hysteresis performance properties.

11 Claims, 4 Drawing Sheets

CARBON BLACK EXHIBITING SUPERIOR TREADWEAR/HYSTERESIS PERFORMANCE

FIELD OF THE INVENTION

The present invention relates to a class of new and novel furnace carbon blacks which are suitable for various applications and particularly well suited for use in rubber compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions. Most importantly, carbon blacks are effective in the preparation of rubber vulcanizates intended for usage in preparing tires.

It is generally desirable in the production of tires to utilize carbon blacks which produce tires with satisfactory abrasion resistance and hysteresis performance. The treadwear properties of a tire are related to abrasion resistance. The greater the abrasion resistance of a tire, the greater the number of miles the tire will last before wearing out. The hysteresis of a rubber compound means the difference between the energy applied to deform a rubber compound, and the energy released as the rubber compound recovers to its initial undeformed state. Tires with lower hysteresis values have reduced rolling resistance and therefore are able to reduce the fuel consumption of the vehicle utilizing the tire. Thus it is particularly desirable to produce carbon blacks capable of imparting greater abrasion resistance and lower hysteresis to tires. Accordingly, one object of the present invention is the production of new carbon blacks which impart improved treadwear and hysteresis performance properties to natural rubbers, synthetic rubbers and blends of natural and synthetic rubbers incorporating the carbon blacks.

Another object of the present invention is new rubber compositions, advantageous for use as passenger car tires, incorporating the new carbon blacks.

Other objects of the present invention will become apparent from the following description and the claims.

SUMMARY OF THE INVENTION

We have discovered a new carbon black having a CTAB of about 90–98 m$^2$/g (square meters per gram), a nitrogen surface area (N$_2$SA) of about 92–102 m$^2$/g, an iodine adsorption number (I$_2$ No.) of 90–98 m$^2$/g, a DBP (dibutyl phthlate number) of about 126–136 cc/100 g (cubic centimeters per 100 grams), a CDBP (crushed dibutyl phthlate number) of about 102–110 cc/100 g, and a Tint of about 104–112. Preferably, the CTAB is about 93–95 m$^2$/g, the N$_2$SA is about 96–98 m$^2$/g, the I$_2$ No. is about 93–97 m$^2$/g, the DBP is about 128–133 cc/100 g, the CDBP is about 104–107 cc/100 g, and the Tint is about 107–109. More preferably, the carbon black is additionally characterized by a Dst (Stokes Diameter) of about 106–118, a Dmode of about 104–112, and a ΔD50 of about 70–90. We have also discovered a new class of rubber compositions containing this carbon black.

The carbon black of the present invention may be produced in a furnace carbon black reactor having a first (combustion) zone, a transition zone, and a stepped reaction zone wherein the diameter of the portion of the reaction zone nearest the transition zone is smaller than the diameter of a portion of the reaction zone further downstream of the transition zone. A carbon black yielding feedstock is injected in any manner known to the art, into a hot combustion gas stream. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid. The process for preparing the novel carbon black of the present invention will be described in greater detail hereinafter.

The rubbers for which the novel carbon black of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon black of the present invention is that the carbon blacks impart greater abrasion resistance and lower hysteresis to compositions containing natural rubbers, synthetic rubbers or blends thereof in which the carbon blacks of the present invention are incorporated.

An advantage of the rubber compositions of the present invention is the that the rubber compositions are particularly well suited for use as passenger car tires with improved treadwear and fuel economy characteristics.

Other advantages of the present invention will become apparent from the following more detailed description of the invention.

DETAILED DESCRIPTION OF THE INVENTION

The carbon black of the present invention is characterized by having a CTAB of about 90–98 $m^2/g$, a $N_2SA$ of about 92–102 $m^2/g$ an $I_2$ No. of 90–98 $m^2/g$, a DBP of about 126–136 cc/100 g, a CDBP of about 102–110 cc/100 g, and a Tint of about 104–112. Preferably, the CTAB is about 93–95 $m^2/g$, the $N_2SA$ is about 96–98 $m^2/g$, the $I_2$ No. is about 93–97 $m^2/g$, the DBP is about 128–133 cc/100 g, the CDBP is about 104–107 cc/100 g, and the Tint is about 107–109. More preferably, the carbon black is additionally characterized by a Dst of about 106–118, a Dmode of about 104–112, and a ΔD50 of about 70–90.

The carbon black of the present invention may be produced in a modular, also referred to as "staged", furnace carbon black reactor. A section of a typical modular furnace carbon black reactor which may be utilized to produce the carbon black of the present invention is depicted in FIG. 1.

Figure 1:
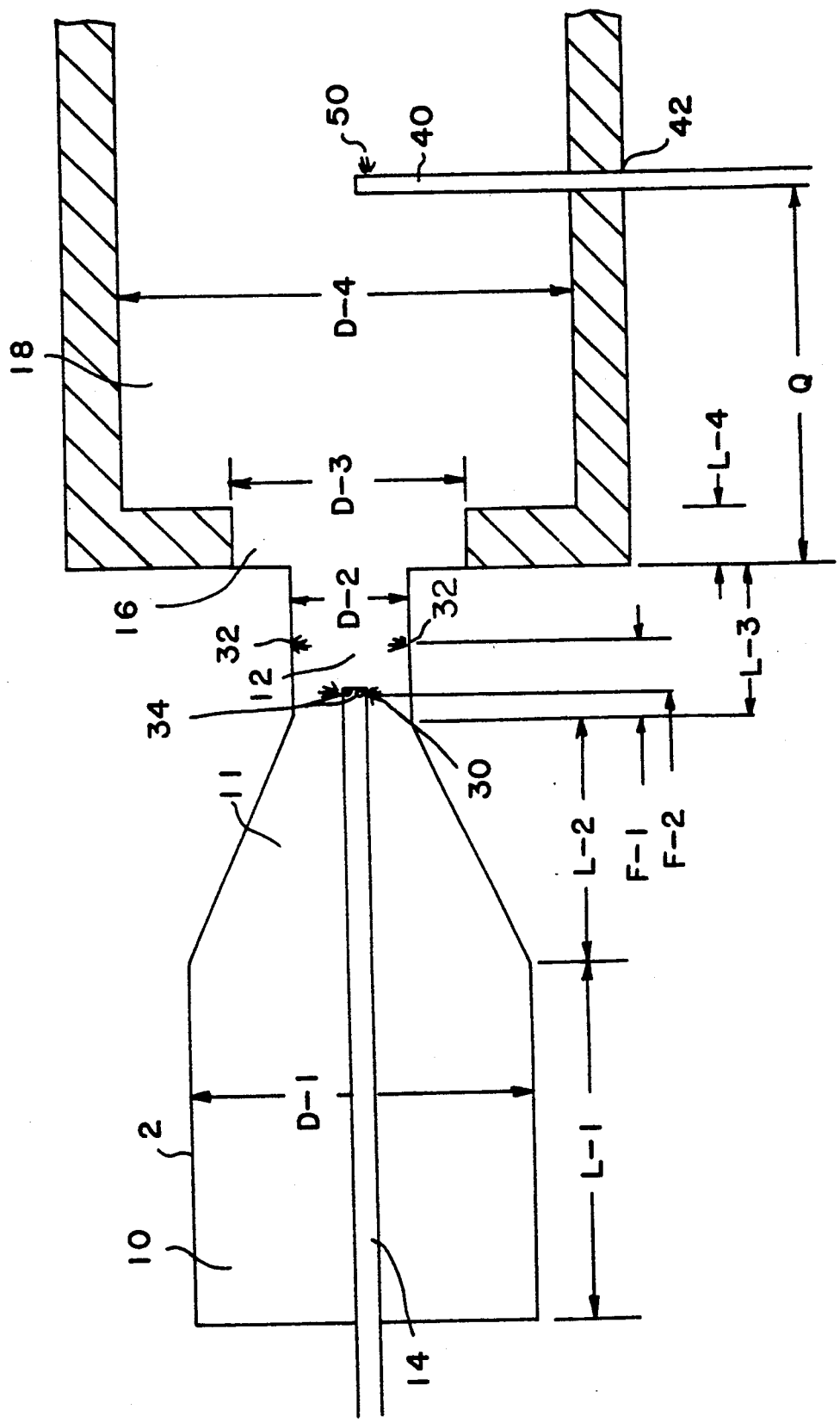
FIG. 1 is a cross-sectional view of a portion of one type of furnace carbon black reactor which may be utilized to produce the carbon blacks of the present invention.

Referring to FIG. 1, the carbon black of the present invention may be produced in a furnace carbon black reactor 2, having a combustion zone 10, which has a zone of converging diameter 11, transition zone 12, and reaction zone 18, which has a zone of restricted diameter 16. The diameter of the combustion zone 10, up to the point where the zone of converging diameter 11, begins is shown as D-1; the diameter of zone 12, as D-2; the diameter of zone 16, as D-3; and the diameter of zone 18, as D-4. The length of the combustion zone 10, up to the point where the zone of converging diameter 11, begins is shown as L-1; the length of the zone of converging diameter is shown as L-2; the length of the transition zone is shown as L-3; and the length of zone 16, is shown as L-4.

To produce the carbon black of the present invention hot combustion gases are generated in combustion zone 10, by contacting a liquid or gaseous fuel with a suitable oxidant stream such as air, oxygen, mixtures of air and oxygen or the like. Among the fuels suitable for use in contacting the oxidant stream in combustion zone 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to natural gas utilized to produce the carbon blacks of the present invention may be from about 10:1 to about 20:1. To facilitate the generation of hot combustion gases, the oxidant stream may be preheated.

The hot combustion gas stream flows downstream from zones 10 and 11 into zones 12, 16 and then 18. The direction of the flow of hot combustion gases is shown in the figure by the arrow. carbon black-yielding feedstock 30, is introduced at point 32 (located in zone 12). Carbon black-yielding feedstock 30, is simultaneously introduced upstream through probe 14, at point 34. The distance from the end of the zone of converging diameter 11, to point 32, is shown as F-1 and the distance from point 32 to upstream point 34 is shown as F-2. To produce the carbon black of the present invention, the feedstock may be injected in an amount of from about 40% to about 85%, by weight, at point 32, and the remainder of the total amount of from about 15% to about 60%, by weight, injected at point 34. Preferably from about 50% to about 65% of the total amount of feedstock, by weight, is introduced at point 32, and the remainder of the total amount of feedstock, from about 35% to about 50%, by weight, is introduced at point 34. In the example described herein carbon black-yielding feedstock 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon black of the present invention.

The mixture of carbon black-yielding feedstock and hot combustion gases flows downstream through zone 12 into zones 16 and 18. Quench 40, located at point 42, injecting quenching fluid 50, which in Example 1 is water, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables—Toluene Discoloration". Q is the distance from the beginning of zone 16 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

CTAB of the carbon blacks was determined according to ASTM Test Procedure D3765-85. Iodine adsorption number of the carbon blacks ($I_2$ No.) was determined according to ASTM Test Procedure D3765-85. Tinting strength (Tint) of the carbon blacks was determined according to ASTM Test Procedure D3265-85a. The DBP (Dibutyl Phthalate) of the carbon black pellets was determined by the procedure set forth in ASTM D2414. The CDBP (Crushed Dibutyl Phthalate) of the carbon black pellets was determined according to the procedure set forth in ASTM D 3493-86.

Figure 4:
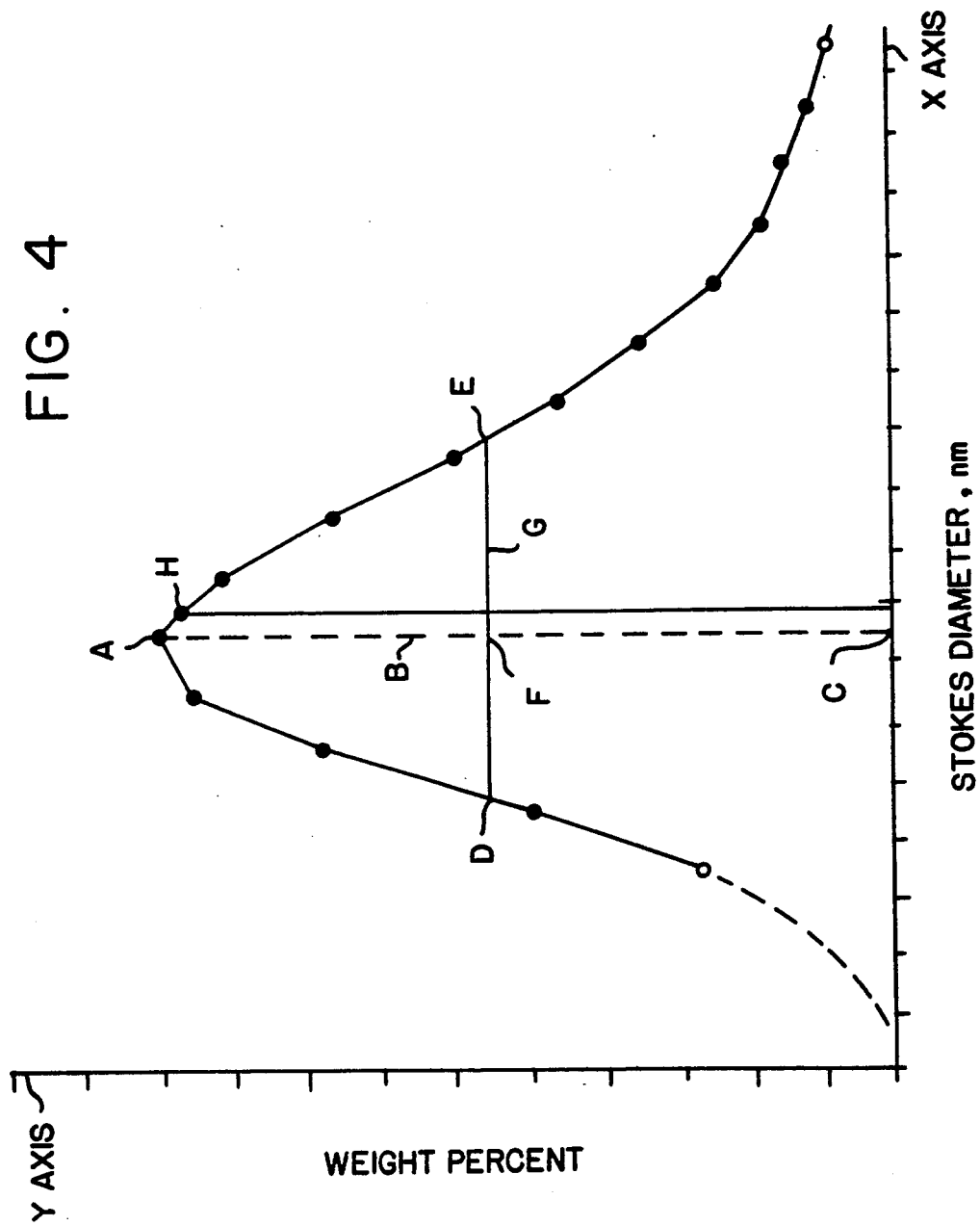
FIG. 4 is a sample histogram of the Stokes diameter of the aggregates of a carbon black sample versus the relative frequency of their occurrence in a given sample.

Dst, Dmode, and ΔD50 of the carbon blacks were determined in the following manner. A histogram is made of the Stokes diameter of the aggregates of the carbon black sample versus the relative frequency of their occurrence in a given sample. As shown in FIG. 4, a line (B) is drawn from the peak (A) of the histogram in a direction parallel to the Y axis to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the ΔD 50 value.

The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Figure 2:
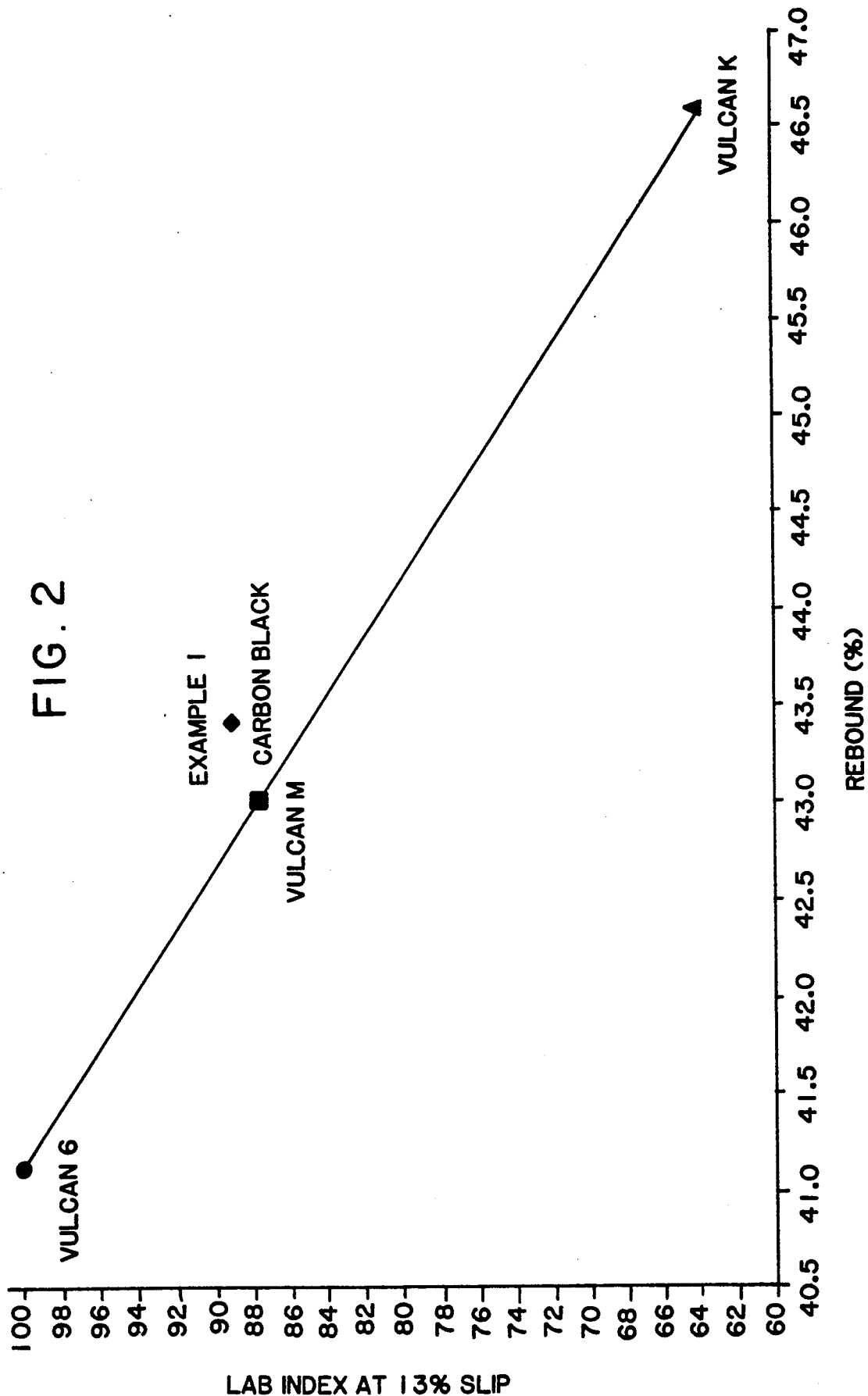
FIG. 2 is a graph of Rebound % versus Laboratory Abrasion Index at 13% Slip for rubber compositions produced with the carbon black of the present invention and for rubber compositions produced with reference carbon blacks.

Mode (Dmode for reporting purposes)—The Stokes diameter at the point of the peak (Point A of FIG. 2 herein) of the distribution curve for Stokes diameter.

Median Stokes diameter—(Dst for reporting purposes) the point on the distribution curve of Stokes diameter where 50% by weight of the sample is either larger or smaller. It therefore represents the median value of the determination.

The abrasion data of the rubber compositions were determined using an abrader which is based on a Lambourn type machine. Abrasion rates (cubic centimeter/centimeter travel) were measured at 7%, 13% and 21% slip. The slip is based on the relative velocity of the plates rather than angle of slip. In the following examples, the abrasion index is the ratio of the abrasion rate of a control composition containing VULCAN 6 carbon black, a trademarked product of Cabot Corporation, Waltham, Mass. divided by the abrasion rate of a composition produced using a specified carbon black of the present invention, at the same slip.

The modulus, tensile and elongation of the rubber compositions were measured by the procedure set forth in ASTM D 412.

Rebound data were detemined on all rubber samples utilizing a ZWICK Rebound Resilience Tester, Model 5109, manufactured by Zwick of America, Inc., Post Office Box 997, East Windsor, Conn. 06088. Instructions for determining the rebound values accompany the instrument.

The effectiveness and advantages of the present invention will be further illustrated by the following examples.

EXAMPLE 1

An example of the novel carbon blacks of the present invention was prepared in a reactor generally described herein, and as depicted in FIG. 1, utilizing the reactor conditions and geometry set forth in Table I. The fuel utilized in the combustion reaction was natural gas. The liquid feedstock utilized had the properties indicated in the chart below:

| Feedstock Properties | |
|---|---|
| Hydrogen/Carbon Ratio | 0.98 |
| Hydrogen (wt. %) | 7.41 |
| Carbon (wt. %) | 89.9 |
| Sulfur (wt. %) | 2.2 |
| A.P.I. Gravity 15.5/15.6 C(60)F [ASTM D-287] | −1.7 |
| Specific Gravity 15.5/15.6 C(60)F [ASTM D-287] | 1.090 |
| Viscosity, SUS (54.4° C.) [ASTM D-88] | 181.7 |
| Viscosity, SUS (98.9° C.) [ASTM D-88] | 46.8 |
| BMCI (Visc-Grav) | 134 |

The reactor conditions and geometry are set forth in Table I below.

TABLE I

| D-1 | 20.5 in. | (520 mm) |
|---|---|---|
| D-2 | 12.4 in. | (315 mm) |
| D-3 | 18 in. | (457 mm) |
| D-4 | 27 in. | (686 mm) |
| L-1 | 27 in. | (686 mm) |
| L-2 | 29 in. | (737 mm) |
| L-3 | 12 in. | (305 mm) |
| L-4 | 9 in. | (229 mm) |
| F-1 | 6 in. | (152 mm) |
| F-2 | 20 in. | (51 mm) |
| Q | 72 in. | (1829 mm) |
| Oil Inj Pt. 32 Tips # × Size | 6 × 0.089 in. | (2.26 mm) |
| Oil Rate 32 | 603 gph | (2285 lph) |
| Oil Press. 32 | 135 psig | (930 MPa) |
| Oil Preheat, 32, | 400° F. | (204° C.) |
| Oil Inj. Pt. 34 Tips # × Size | 6 × 0.089 in. | (2.26 mm) |
| Oil Rate 34 | 494 gph | (1872 lph) |
| Oil Press. 34 | 135 psig | (930 MPa) |
| Oil Preheat 34 | 400° F. | (204° C.) |
| Comb. Air | 550 kscfh | (15,570 klph) |
| Comb. Air Preheat | 1200° F. | (649° C.) |
| Natural Gas | 28.4 kscfh | (804 klph) |
| Air to Burn Ratio | 9.68 | |
| Quench Press. | 200 psig | (1379 MPa) |
| Temp. at Quench | 1480° F. | (804° C.) |
| Dryer Temp. | 500–650° F. | (260–343° C.) |

Inj. = Injection; Comb. = combustion; Press. = pressure
32 = Point 32 on FIG. 1; 34 = Point 34 on FIG. 1;
gph = gallons per hour; psi = pounds per square inch; in. = inches;
°F. = degrees Fahrenheit; mm = millimeters; lph = liters per hour;
°C. = degrees Centigrade; MPa = megapascals
kscfh = standard cubic feet per hour, in thousands
klph = liter per hour, in thousands The carbon black produced in Example 1 was then analyzed according to the procedures described herein. The analytical properties of the black produced, after wet pelletizing and drying, and 3 reference carbon blacks were as follows:

| | Ex- | Carbon Black | | |
|---|---|---|---|---|
| | ample 1 | VULCAN 6 | VULCAN M | VULCAN K |
| CTAB (m²/g) | 94 | 109 | 94 | 74 |
| N₂SA (m²/g) | 97 | 111 | 91 | 71 |
| I₂ No. (m²/g) | 94 | 121 | 90 | 68 |
| DBP (cc/100 g) | 131 | 114 | 120 | 120 |
| CDBP (cc/100 g) | 106 | 98 | 97 | 96 |
| Tint (%) | 108 | 114 | 113 | 101 |
| Dst | 112 | 94 | 102 | 118 |
| Dmode | 108 | 89 | 96 | 111 |
| ΔD50 | 80 | 62 | 64 | 68 |

VULCAN 6 carbon black, VULCAN M carbon black and VULCAN K carbon black are trademarked carbon blacks manufactured and sold by Cabot Corporation, Waltham, Massachusetts.

EXAMPLE 2

This example illustrates the use of the novel carbon black of the present invention in a rubber composition in comparison with rubber compositions produced using VULCAN 6 carbon black, VULCAN M carbon black and VULCAN K carbon black. Rubber composition A was made with the carbon black of the present invention produced in Example 1. Rubber composition B was made with VULCAN 6 carbon black. Rubber composition C was made with VULCAN M carbon black. Rubber composition D was made with VULCAN K carbon black. Rubber compositions A, B, C and D were prepared incorporating each of the carbon black samples according to the rubber formulation procedure shown below in Table II.

TABLE II

| INGREDIENT | Part by weight |
|---|---|
| SBR 1712 | 89.38 |
| CIS-1,4 BR | 35.00 |
| Carbon Black | 65.00 |
| Oil (Sundex 790) | 10.62 |
| Zinc Oxide | 3.00 |
| Sunproof Improved Stabilizer | 2.50 |
| Wingstay 100 | 2.00 |
| Stearic Acid | 2.00 |
| N-cyclohexyl-2-benzothiazolesulfenamide | 1.50 |
| 2-mercaptobenzothiazole | 0.20 |
| Sulfur | 1.75 |

SBR 1712 = an oil extended styrene-butadiene copolymer having a content of 23.5% styrene and 76.5% butadiene.
CIS 1,4 BR = a polybutadiene rubber
Sundex 790 = ASTM D2226, Type 101 oil
Sunproof Improved Stabilizer = a stabilizer
Wingstay 100 = mixed diaryl p-phenylenediamine The static properties of these rubber composition were then evaluated according to the ASTM procedures described herein. The results were as follows:

| Rubber Composition | Modulus 300% El (psi) | Tensile (psi) | El$_b$* (%) |
|---|---|---|---|
| A | 1607 | 2938 | 500 |
| B | 1243 | 2790 | 542 |
| C | 1510 | 2642 | 482 |
| D | 1506 | 2655 | 496 |

*El$_b$ = elongation at break; psi = pounds/square inch

These results show that the static properties of the rubber composition A produced with the carbon black of the present invention are comparable to those of rubber compositions B, C and D produced with reference carbon blacks.

The Laboratory Abrasion Index and Rebound % of each rubber composition were also evaluated as described herein. The results were as follows:

| Rubber Composition | 7% Slip | 13% Slip | 21% Slip | Rebound % |
| --- | --- | --- | --- | --- |
| A | 85.3 | 89.0 | 119.5 | 43.4 |
| B | 100.0 | 100.0 | 100.0 | 41.1 |
| C | 91.4 | 87.5 | 90.8 | 43.0 |
| D | 69.5 | 64.0 | 68.7 | 46.6 |

Figure 3:
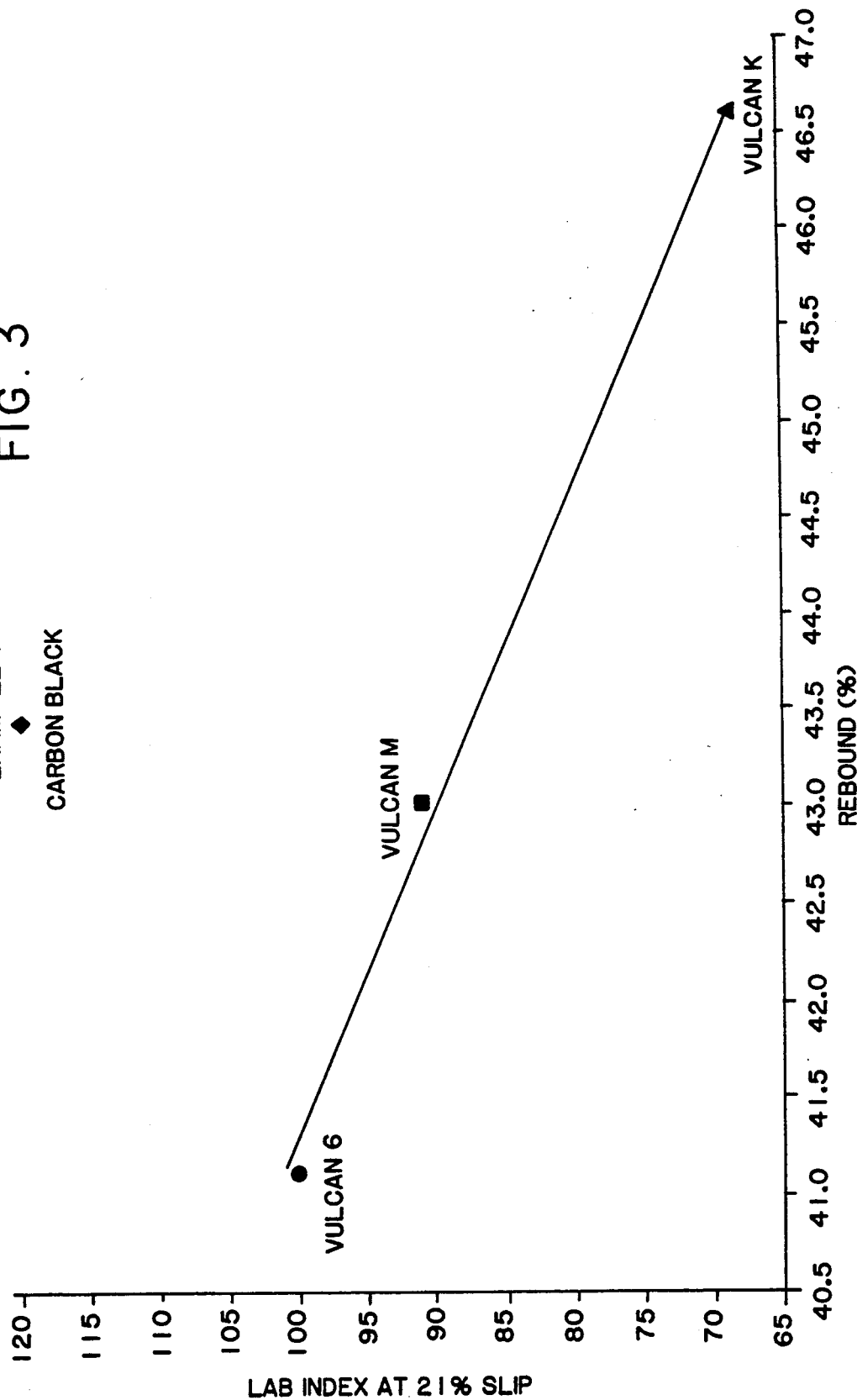
FIG. 3 is a graph of Rebound % versus Laboratory Abrasion Index at 21% Slip for rubber compositions produced with the carbon black of the present invention and for rubber compositions produced with reference carbon blacks.

The laboratory abrasion index data show that rubber composition A, containing the carbon black of the present invention, exhibits higher abrasion resistance at the 21% slip value, than rubber compositions B, C and D incorporating the control carbon blacks. The superior abrasion/hysteresis performance properties of the rubber composition containing the carbon black of the present invention, at 13% and 21% slip values are depicted graphically in FIGS. 2 and 3.

It should be clearly understood that the forms of the present invention herein described are illustrative only and are not intended to limit the scope of the invention.

We claim:

1. A carbon black having a CTAB of about 90–98 $m^2/g$, a $N_2SA$ of about 90–102 $m^2/g$, an $I_2$ No. of 90–98 $m^2/g$, a DBP of about 126–136 cc/100 g, a CDBP of about 102–110 cc/100 g, a Tint of about 104–112, a Dst of about 106–118 nm, a Dmode of about 104–12 nm, and a $\Delta D50$ of about 70–90 nm.

2. The carbon black of claim 1 wherein the CTAB is about 93–95 $m^2/g$, the $N_2SA$ is about 96–98 $m^2/g$, the $I_2$ No. is about 93–97 $m^2/g$, the DBP is about 128–133 cc/100 g, the CDBP is about 104–107 cc/100 g and the Tint is about 107–109.

3. The carbon black of claim 2 wherein the CTAB is 94 $m^2/g$, the $N_2SA$ is 97 $m^2/g$, the $I_2$No. is 94 $m^2/g$, the DBP is 131 cc/100 g, the CDBP is 106 cc/100 g, the Tint is 108, the Dst is about 112 nm, the Dmode is about 108 nm, and the $\Delta D50$ is about 80 nm.

4. A rubber composition comprising about 100 parts, by weight, of a rubber and from about 10 to about 250 parts, by weight, of a carbon black having a CTAB of about 90–98 $m^2/g$, $N_2SA$ of about 92–102 $m^2/g$, an $I_2$ No. of 90–98 $m^2/g$, a DBP of about 126–136 cc/100 g, a CDBP of about 102–110 cc/100 g, a Tint of about 104–112, a Dst of about 106–118 nm, a Dmode of about 104–112 nm, and a $\Delta D50$ of about 70–90 nm.

5. The rubber composition of claim 4 wherein the carbon black has a CTAB of about 93–95 $m^2/g$, a $N_2SA$ of about 96–98 $m^2/g$, an $I_2$ No. of 93–97 $m^2/g$, a DBP of about 128–133 cc/100 g, a CDBP of about 104–107 cc/100 g, and a Tint of about 107–109.

6. The rubber composition of claim 5 wherein the CTAB of the carbon black is 94 $m^2/g$, the of the carbon black $N_2SA$ is 97 $m^2/g$, the $I_2$ No. of the carbon black is 94 $m^2/g$, the DBP of the carbon black is 131 cc/100 g, the CDBP of the carbon black is 106 cc/100 g, the Tint of the carbon black is 108, the Dst of the carbon black is about 112 nm, the Dmode of the carbon black is about 108 nm, and the $\Delta D50$ of the carbon black is about 80 nm.

7. The rubber composition of claim 4 wherein the rubber is synthetic rubber.

8. The rubber composition of claim 4 wherein the rubber is a blend of natural and synthetic rubbers.

9. The rubber composition of claim 4 wherein the rubber is a blend of synthetic rubbers.

10. The rubber composition of claim 4 wherein the carbon black is present in an amount of from about 20 to about 100 parts by weight per 100 parts by weight rubber.

11. The rubber composition of claim 4 wherein the carbon black is present in an amount of from about 40 to about 80 parts by weight per 100 parts by weight rubber.

* * * * *